United States Patent [19]

Wilder et al.

[11] Patent Number: 5,564,471

[45] Date of Patent: Oct. 15, 1996

[54] FUEL HOSE BREAKAWAY UNIT

[75] Inventors: Paul R. Wilder, Hamilton; David K. Larson; Aaron E. Thomas, both of Cincinnati, all of Ohio

[73] Assignee: Dover Corporation, New York, N.Y.

[21] Appl. No.: 376,792

[22] Filed: Jan. 23, 1995

[51] Int. Cl.$^6$ ............................................. F16L 29/00
[52] U.S. Cl. ........................................ 137/614.04; 285/1
[58] Field of Search ................. 137/614.04, 614.05, 137/614.03; 285/1

[56] References Cited

U.S. PATENT DOCUMENTS

| | | | |
|---|---|---|---|
| 2,952,482 | 9/1960 | Torres | 285/1 X |
| 3,201,147 | 8/1965 | De Cenzo | 285/1 |
| 3,454,047 | 7/1969 | Johnston | 285/1 X |
| 4,124,228 | 11/1978 | Morrison | 285/1 |
| 4,827,977 | 5/1989 | Fink, Jr. . | |
| 5,135,029 | 8/1992 | Anderson et al. . | |
| 5,211,197 | 5/1993 | Marrison et al. | 137/614.04 |

*Primary Examiner*—Kevin Lee
*Attorney, Agent, or Firm*—Dinsmore & Shohl

[57] ABSTRACT

A breakaway unit which is adapted for mounting in a fuel hose between a fuel dispenser and nozzle. The breakaway unit comprises male and female couplers which are normally locked in an assembled position, but which are releasable at a separation force produced when a vehicle drives away from the dispenser with the nozzle lodged in its fuel tank. The couplers include fuel passages which are adapted for connection to a fuel hose in series flow relation and valves disposed in the fuel passages and automatically shiftable from an open to a closed position when the couplers are separated. Fixed abutment lugs are formed on one of the couplers and are shaped to engage force fingers carried by the other coupler. Moveable lugs having ramped abutment surfaces are located on the fingers and engage ramped surfaces on the fixed abutment lugs to lock the couplers together. A sleeve is adjustably mounted on the force fingers to control the separation of the couplers. In the assembled position, the sleeve prevents separation of the force fingers and fixed lugs. A spring is disposed adjacent to the sleeve. When a separation force is applied to the unit, the spring compresses, displacing the sleeve away from the force fingers, allowing the fingers to flex outwardly away from the lugs to decouple the unit. The spring also absorbs line shock forces applied to the breakaway unit in order to limit the effects of these forces on the remaining components in the unit.

24 Claims, 6 Drawing Sheets

FUEL HOSE BREAKAWAY UNIT

TECHNICAL FIELD

The present invention relates to a breakaway unit for use in a fuel hose connected between a fuel dispenser and nozzle to separate the nozzle from the fuel dispenser in the event that a vehicle drives away from the dispenser with the nozzle still lodged in the vehicle's fuel tank inlet, and more particularly, to a breakaway unit which provides improved control over the force at which the unit separates and which absorbs line shock forces which occur during normal fueling operations so that the unit does not prematurely separate.

BACKGROUND OF THE INVENTION

Self-service gasoline stations have become widely popular in recent years as a lower cost means of dispensing gasoline. Self-service stations require less personnel, thereby cutting down on the operating costs for the station owner, resulting in greater profits, and savings which can be passed on to customers in the form of lower fuel prices. While there are many advantages to these stations, there are also several problems which can arise. One problem which occurs infrequently, but which can have serious consequences, is when a customer forgets to remove the fuel nozzle from a vehicle's fuel tank inlet before driving away. This situation, which is known as a "drive away", can be very hazardous and costly. When a drive away occurs, a tremendous force is created on the fuel hose attaching the nozzle to the fuel dispenser. This force can cause the hose to rupture, spilling fuel all about the station and creating a serious fire hazard. In addition, the force on the hose can travel back to the dispenser and cause the dispenser to be ripped out of its base or pedestal, or damaged in a variety of other ways. This results in the need for expensive repair work or replacement of the dispenser. Therefore, it has been desirable to find a coupling device which will enable a fuel nozzle to disengage from a dispenser without damage or fuel spillage.

In the past, breakaway units have been developed which enable a fuel hose to be easily and safely severed in the event of a drive away. Among the approaches that have been developed are breakaway units which comprise a valve in series flow relation with a fuel hose and a fuel nozzle. In these units, the tension force caused by the drive away is exerted on the hose, separating or disconnecting the breakaway valve when that force exceeds a force which would cause the hose to rupture, or otherwise cause damage to the dispenser and spillage of fuel which would create a fire hazard. These units typically include valves of the so-called "dry disconnect" type which seal the separated portions of the valve so that there is only a minimal amount of fuel released when a drive away occurs.

Recently, service stations have begun using so-called "high hose" dispensers in which the nozzle hose is connected to and extends from the upper portion of the dispenser. This type of dispenser is typically anchored at its base on a pedestal, or island, at a service station. This places the point of connection of the fuel hose some eight to twelve feet above ground level. Thus, when a drive away occurs, the pull of the hose on the dispenser has a high leverage tending to topple the dispenser. This has led to a requirement that the maximum permissible breakaway force be set at lower levels than were previously accepted as providing adequate protection.

The reduction of the force required to separate a hose breakaway unit introduces a further problem in that the lowered, permissible, breakaway force approaches the hydraulic, line shock forces which can be generated in a hose when the nozzle valve suddenly closes. Many nozzles have a mechanism for automatically closing the nozzle valve when the fuel in a vehicle's tank reaches a predetermined level. Many such mechanisms close the nozzle valve substantially instantaneously, while fuel is being delivered at a high flow rate. Such closure can result in momentary line shock forces on the hose which can be considerably higher than the desired maximum breakaway force of 250 pounds. Thus, close tolerances must be maintained in the breakaway force of the coupler to prevent decoupling during normal operation.

The most widely used hose breakaway units depend on shear pins (or other elements which fracture) as the means to release a delivery hose in the event of a drive away. Shear pins have long been recognized as a reliable means for decoupling one element from another when a load exceeds a given limit. However, where they are subject to repeated loads approaching their failure strength, as would be generated by line shock forces, fatigue stresses reduce the force at which shear occurs. Breakaway valves embodying shear pins thus become unreliable in that they can separate, to render a nozzle unserviceable, in the normal delivery of fuel. This is both an inconvenience as well as an undesirable expense to the fuel vendor.

Thus, even though shear pins can initially provide a close tolerance in the force at which they will fail, fatigue stresses can increase this tolerance so that failure occurs at a force much lower than required for practical, safety purposes.

Other hose breakaway units have been developed which do not depend on shear pins to separate the unit in the event of a driveway. These units typical utilize a resilient member such as a spring to maintain the components of the unit in an assembled relation and prevent the unit from easily separating during normal use. Since these units utilize resilient members rather than shear pins to couple the unit, these units can often be reassembled after a drive away separation without the need to repair or replace parts in the unit.

Although the use of springs is beneficial in that it allows the unit to be easily reassembled, springs alone typically do not enable close tolerancing of the separation force. Thus, as the range between the required separation force and the peak line shock forces narrows, it becomes increasingly likely that these units will untimely or prematurely separate. In addition, these breakaway units typically are not able to absorb or dissipate the line shock forces applied to the unit. Without a means to check these forces, additional wear and stress is placed upon the unit, increasing the likelihood that repair or early replacement will be required.

Thus, a need exists for a breakaway unit which has an improved separation force tolerance and which absorbs line shock forces to prevent untimely separation and wear and tear on the unit.

SUMMARY OF THE INVENTION

Accordingly, it is a principal object of the present invention to provide an improved fuel hose breakaway unit which prevents damage to a fuel dispenser and fuel hose in the event of a drive away.

In particular, it is an object of the present invention to provide a breakaway unit which provides close tolerancing over the separation force to prevent premature decoupling.

Another object of the present invention is to provide a hose breakaway unit which absorbs line shock forces which occur during normal fueling operations.

Yet another object of the present invention is to provide an improved hose breakaway unit which is easily reassembled with a minimum of force, after a drive away, by inserting one coupler of the unit into the other coupler and rotating the couplers into locking engagement.

Still another object of the present invention is to provide a breakaway unit which achieves both a "dry" disconnect and a "dry" reconnect, thereby reducing the loss of fuel occurring from separation and reconnection of the unit.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects, and in accordance with the purposes of the present invention as described above, a breakaway unit for a fuel hose is provided comprising a male coupler and a female coupler which are releasably lockable in an assembled relation. Each of the couplers includes an interior fuel passage which is adapted for connection to a fuel hose in series flow relation. Each of the couplers also includes a valve means disposed in the fuel passage, which is automatically shiftable from an open to a closed position when the couplers are separated to shut off fuel flow in the passages.

Fixed abutment lugs project from one of the couplers and engage force fingers carried by the other coupler in an assembled position, to prevent longitudinal separation of the couplers. An adjustable interlock means is located adjacent to the fixed abutment lugs to lock the force fingers against the lugs in the assembled position, and to resist relative rotation of the couplers when locked. Each of the force fingers includes a lug projecting from one end. Ramped abutment surfaces on each of the finger lugs engage corresponding surfaces on the fixed abutment lugs to resist separation. The angle of the ramped abutment surfaces being selected to control the force at which the couplers separate.

An adjustable sleeve is connected about one of the couplers as a further means of controlling the separation force of the couplers. In the assembled position, the sleeve is disposed so as to surround the force fingers adjacent to the ramped abutment surfaces to prevent radial displacement of the force fingers from the fixed abutment lugs. The sleeve is axially displacable along the force fingers away from the ramped abutment surfaces in response to the application of a predetermined separation force on one of the couplers, to permit the force fingers to flex away from the lugs and release the couplers.

A resilient means, which may take the form of a spring, is disposed adjacent to the force fingers and sleeve, to control the displacement of the force fingers and sleeve in relation to the applied tension or separation force. In addition to providing a means for displacing the sleeve upon application of a tension force, the resilient means also absorbs line shock forces applied to the breakaway unit in order to limit the effects of these forces on the remaining components in the unit.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different, obvious aspects all without departing from the invention. Accordingly, the drawings and description should be regarded as illustrative in nature and not as restrictive.

DETAILED DESCRIPTION OF THE PREFERRED EMBODIMENT

Figure 1:
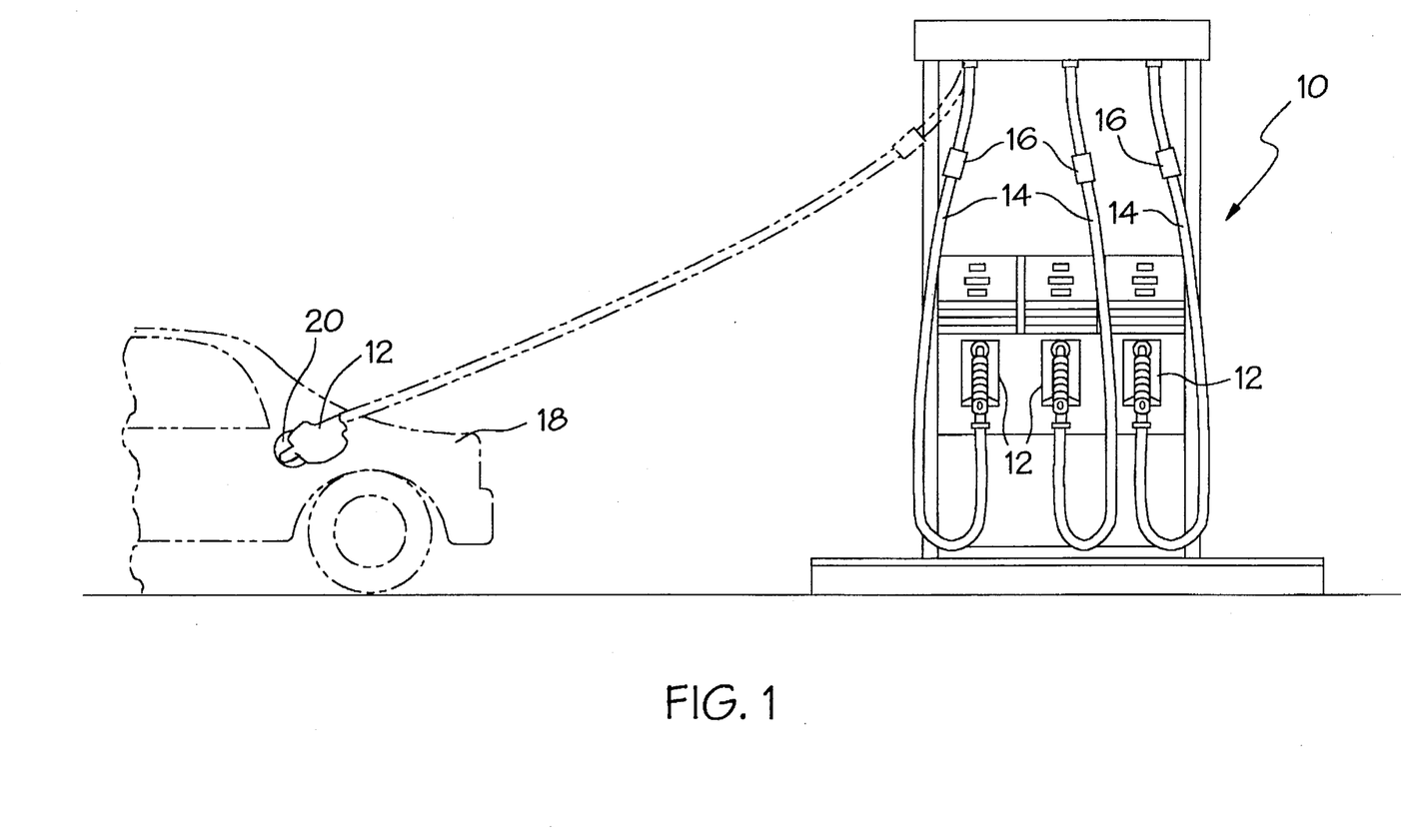
FIG. 1 is an environmental view in elevation of a fuel dispensing unit in which a breakaway unit constructed according to the principle of the present invention is incorporated.

Referring now to the drawings, FIG. 1 illustrates a fuel dispenser 10 having three nozzles 12 for delivery of fuel, such as gasoline or the like, into the fuel tank inlet of a vehicle. Each nozzle 12 is mounted on a hose 14 for connection with a fuel conduit mounted interiorly of the dispenser 10. The internal fuel conduits, in turn, are connected to a source of pressurized fuel. In use, a nozzle 12 is removed from the dispenser 10 and inserted into a vehicle's fuel tank inlet for the delivery of fuel.

Pursuant to the present invention, each hose 14 includes a breakaway unit 16 which will now be described in detail. The function of the breakaway unit 16 is to protect the dispenser 10 from serious damage in the event that a vehicle 18 is driven away from the dispenser while the nozzle 12 is in the vehicle's fuel tank inlet 20. The unit 16 also provides protection if the hose 14 is otherwise caught on the drive away vehicle, such as by being caught on the vehicle's bumper. In addition to protecting the dispenser 10, the breakaway unit 16 absorbs line shock forces in the hose 14, such as might occur when the nozzle valve automatically closes when the fuel in the vehicle's tank reaches a predetermined level. Also, the breakaway unit 16 serves the function of minimizing, if not eliminating, spillage of fuel when a drive away occurs.

Figure 2:
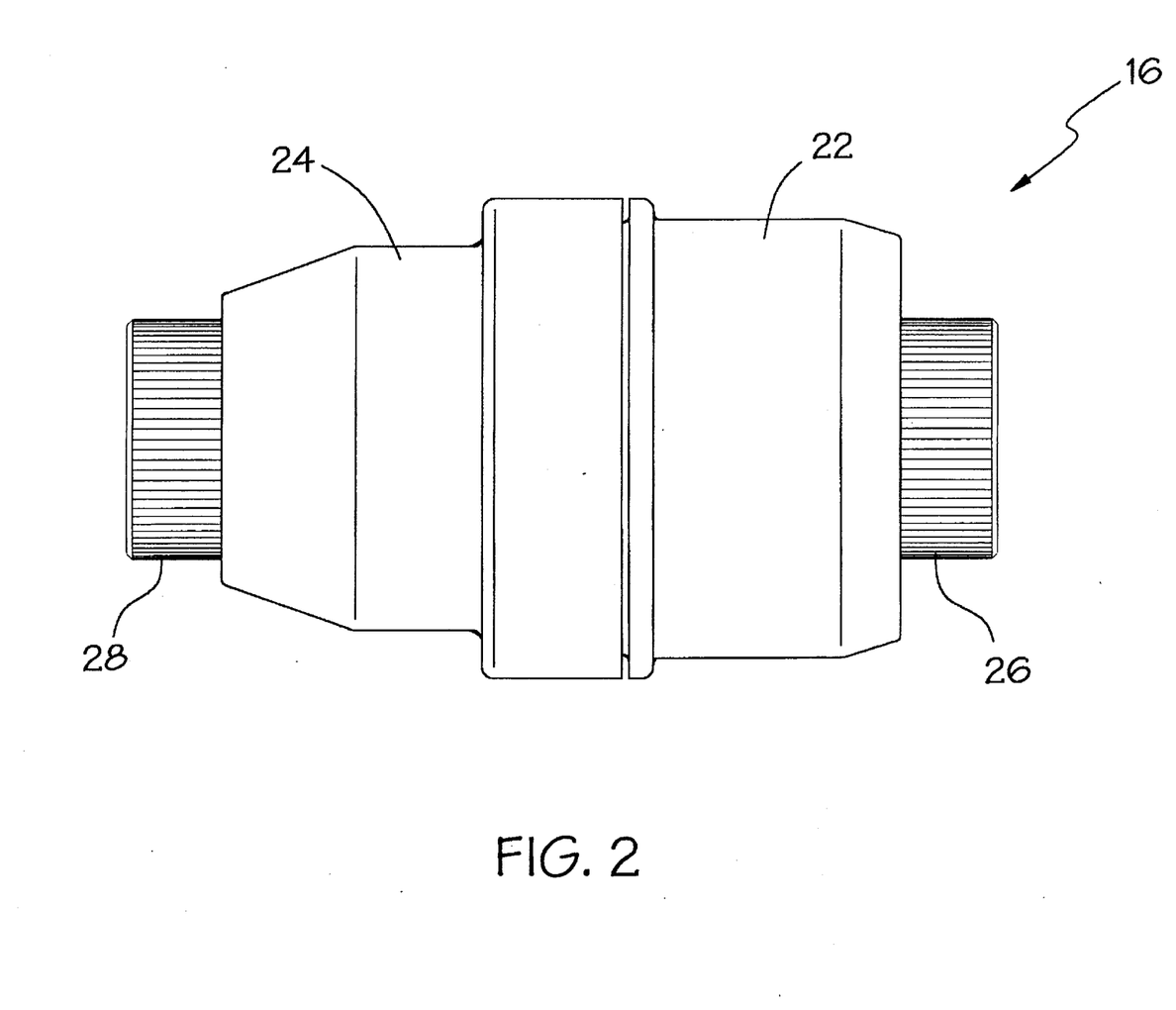
FIG. 2 is an elevational view of a breakaway unit of FIG. 1.

As shown in FIG. 2, the breakaway unit 16 comprises a male coupler 22 and a female coupler 24. The male coupler 22 is adapted to telescope into the female coupler 24 in the assembled position of the unit 16. Each of the couplers 22, 24 include fittings 26, 28 having interior threaded portions, to provide for threaded engagement of the couplers onto respective portions of the fuel hose. Couplers 22, 24 also include interior fuel passages which communicate with the interior portions of the fittings 26, 28 in series flow relation to allow fuel flow through the unit 16, as will be described in further detail below.

Figure 3:
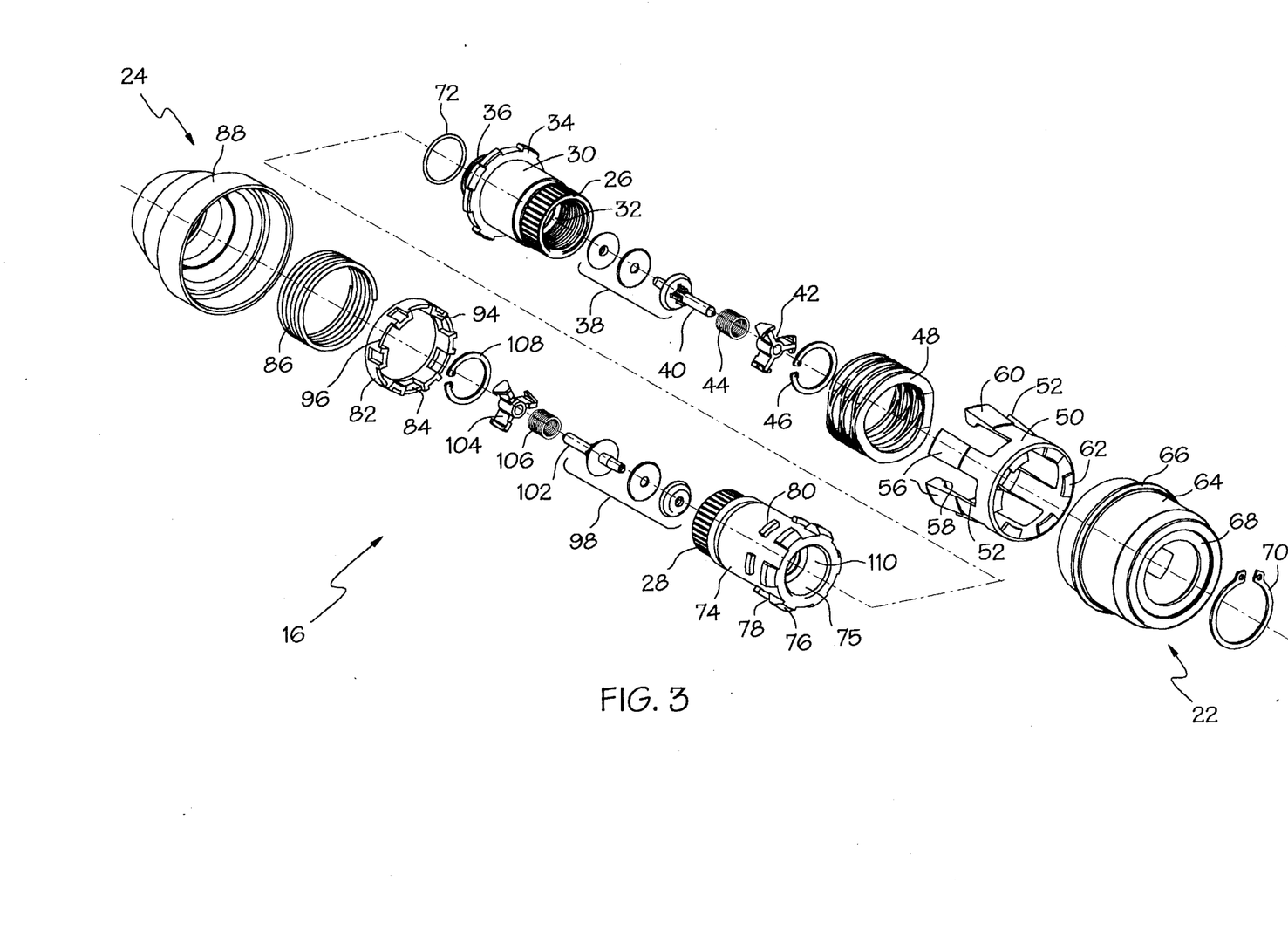
FIG. 3 is an exploded view showing the various components which comprise the breakaway unit of FIG. 2.
Figure 4:
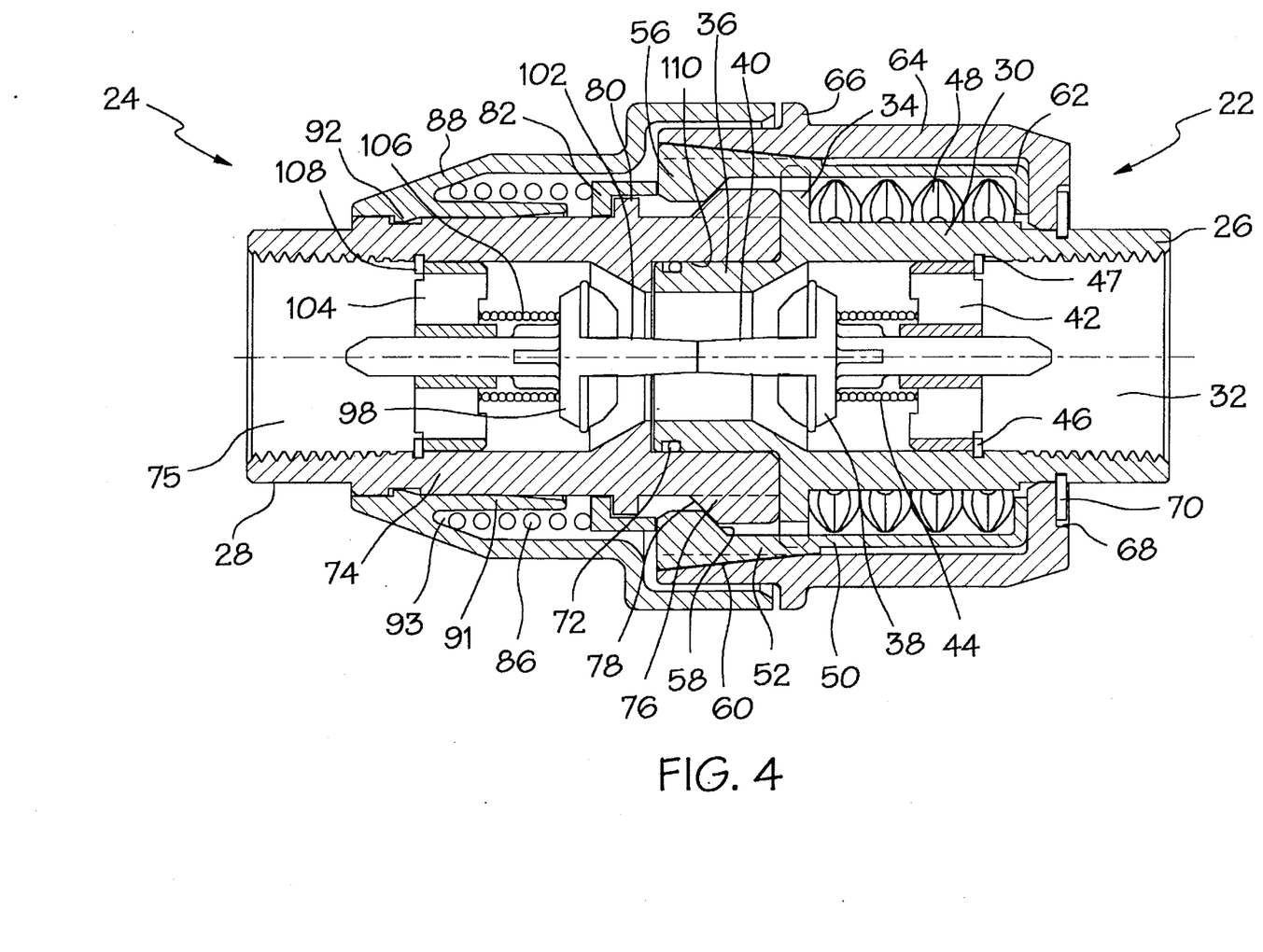
FIG. 4 is a longitudinal sectional view of the breakaway unit of FIG. 2 in an assembled position.

FIG. 3 illustrates the individual components that make up the unit 16 of the preferred embodiment in exploded view, while FIG. 4 illustrates these same components positioned within the assembled unit. As can be seen in these figures, the male coupler portion of the unit, designated generally as 22, includes a male body 30 with a fitting 26 formed on one end thereof. The male body 30 is substantially cylindrical and longitudinal and includes an interior fuel passage 32 extending the length of the body. A flange 34 extends radially outwardly from the periphery of the body 30, and a forward extension 36 extends axially outwardly from the flange 34 to the mating end of the body. A popper valve 38 is disposed in the fuel passage 32 to selectively open and close the passage. The poppet valve 38 includes a stem 40 which is slidable within a spider guide 42. A compression spring 44 is disposed about the poppet 38 to urge the poppet towards its closed position. A snap ring 46 extends between a notch 47 formed in the circumference of the fuel passage 32 and the guide 42 to retain the guide and poppet 38 within the fuel passage.

A resilient member, such as a spring 48, is mounted on the body 30 so as to abut against the flange 34. In the preferred embodiment, the resilient member is a spiral wave spring having a diameter of 1.33 inches and a load rating of 285–325 lbs.

A coupling 50 is designed for mounting on the spring 48 so as to be movable in conjunction with the spring. The coupling 50 includes a plurality of flexible force fingers 52 extending forwardly towards the mating end of the coupler 22. The fingers 52 are in the form of spaced annular segments having an inner diameter which approximates the outer diameter of the flange 34. In the specifically illustrated embodiment, six force fingers 52 are employed. Each of the force fingers 52 includes a lug 56 formed at its outer end. A ramped abutment surface 58 extends along one side of each lug 56 adjacent to the finger 52. In the preferred embodiment, the ramped surface 58 extends at a 45 degree angle to the adjacent surfaces of the lugs 56 and fingers 52. Each lug 56 also includes a peripheral surface 60 which tapers inwardly towards the fingers 52. In the preferred embodiment, the surface 60 tapers at an angle of approximately 6 degrees. At the end opposite the fingers 52, the coupling 50 includes a radially inwardly extending portion 62 which engages the end of the spring 48, opposite the flange 34, to retain the spring in position between the flange and coupling.

A sleeve 64 is mounted about the periphery of the coupling 50 and force fingers 52. Preferably, the sleeve 64 is comprised of a rigid material, such as plastic, to form a protective barrier for the coupling 22. One end of the sleeve 64 extends radially inwardly to the body 30 in order to form a connection between the sleeve and the body. The opposite end of the sleeve 64 is open and surrounds the force fingers 52 and lugs 56. The interior diameter of the sleeve 64 adjacent to the open end tapers inwardly away from the mating end of the coupler 22. The angle of taper preferably corresponds to the taper of the outer lug surfaces 60, so that the sleeve slidingly engages the lugs 56 along the surface 60.

A flange 66 extends from the exterior circumference of the sleeve 64. Flange 66 aligns axially with the flange 34 in the coupled position as shown in FIG. 4. The flange 66 also abuts against a mating sleeve 88 on the female coupler 24, in the coupled position, as will be described in more detail below. The sleeve 64 includes a groove 68 located in the inwardly extending end adjacent body 30. A snap ring 70 extends between a notch formed in the outlet body 30 and the groove 68 to retain the sleeve 64, coupling 50 and spring 48 in position on the outlet body. An O-ring 72 is adapted for disposal in a notch formed in the forward extension 36 to provide a seal between the fuel passages of the couplers 22, 24.

The female coupler 24 includes a longitudinal, cylindrical body 74, of which the fitting 28 comprises one end. A fuel passage 75 extends longitudinally through the interior of the body 74. A plurality of fixed abutment lugs 76 project from the body 74 adjacent the inner, mating end of the body. Preferably, six fixed lugs are employed. The lugs 76 are angularly spaced about the body 74, so that an area slightly greater than the width of each finger lug 56 is located between adjacent lugs. Each of the lugs 76 includes a ramped abutment surface 78. The abutment surfaces 78 are located on the lug side opposite the mating end, to enable the surfaces 78 to mate with the ramped surfaces 58 on the force finger lugs 56 when coupled. A second set of fixed lugs 80 also project from the body 74, and are aligned with and spaced from the first set of lugs 76.

An interlock ring 82 is mounted on the body 74. The interlock 82 includes angularly spaced, longitudinal slots 84 which slidingly receive the second set of fixed lugs 80. The interlock 82 is yieldingly maintained in engagement with the lugs 80 by a spring 86, which is mounted on the body 74 so as to lie adjacent to the interlock. The interlock 82 also has an end face 94, facing the inner, mating end of the female coupler 24, with radial slots 96 formed therein. The radial slots 96 are adapted to receive the lugs 56, which project outwardly from the fingers 52, in the coupled position shown in FIG. 4.

A second sleeve 88 extends about the periphery of the body 74 and interlock 82. The sleeve 88 is preferably comprised of the same material as the sleeve 64 to provide a protective barrier for the body 74 and other components. The sleeve 88 includes an inwardly extending branch 91, shown in FIG. 4, having an inner diameter which approximates the outer diameter of the body 74 adjacent the fitting 28. The branch 91 and sleeve 88 form a slot 93. The spring 86 is disposed in the slot 93 and is retained thereby in close proximity to the interlock 82. The sleeve 88 includes an annular projection 92 formed on the outer end, adjacent the branch 91. The projection 92 snaps into a notch formed on the periphery of the body 74 to retain the sleeve 88 on the body.

A poppet valve 98 is disposed in the fuel passage 75 to selectively open and close the passage. The poppet 98 includes a stem 102 which is slidable within a spider guide 104. A compression spring 106 is disposed about the poppet 98 to urge the poppet towards its closed position. A snap ring 108 is disposed in a notch formed in the circumference of the fuel passage 75 to retain the guide 104 and poppet 98 in position within the fuel passage. In the coupled position shown in FIG. 4, the forward extension 36 of body 30 is received within a bore 110 formed in the mating end of the body 74. In this position, the valve stems 40, 102 abut, pushing against the force of the springs 44, 106, and enabling the valves 38, 98 to open and provide for the flow of fuel through the passages 32, 75.

OPERATION

To assemble the couplers 22, 24 into the normal operating position shown in FIG. 4, the mating ends of the couplers are brought together so that the lugs 76 are aligned with the spaces between the fingers 52. The forward extension 36 of the male body 30 is telescoped into the bore 110 until the lugs 76 are disposed in the spaces between the finger lugs 56.

As the couplers 22, 24 are pushed together, the forward ends of the lugs 56 engage the end face 94 of the interlock 82 and compress the spring 86. The male coupler 22 is then rotated to bring the finger lugs 56 into alignment with the lugs 76, and between the lugs 76 and the interlock lugs 80. Once this alignment is obtained, the coupler 22 is released. The decompression of the spring 86 then displaces the interlock 82 so that the finger lugs 56 are captured in the radial slots 96. An audible noise, such as a "click", is produced as the interlock 82 is displaced to capture the finger lugs 56, and lock the couplers 22, 24 together. The couplers 22, 24 are thus readily brought to an operative, coupled position, requiring a minimum of effort, either in the initial assembly of the breakaway unit, or in restoring it to an operational condition after a drive away incident.

In normal operation, the couplers 22, 24 of the breakaway unit 16 are assembled as shown in FIG. 4, and the unit is connected at one end by a length of fuel hose to a nozzle 12, and is connected at the other end by a second length of fuel hose to a fuel dispenser 10. In the normal operation of the fuel dispenser 10 and nozzle 12, the breakaway unit 16 serves no function other than to provide the necessary fuel passages for delivery of the fuel.

However, when a drive away occurs, the nozzle 12, which remains in the fuel tank inlet, exerts a tension force on the hose 14 as the nozzle is pulled away from the dispenser. This tension force is resisted by the connection of the hose to the dispenser 10. The pull on the hose 14 is translated into an essentially pure, axial force which is applied to the unit 16. This separation force is transmitted through the unit 16, and tends to pull the male coupler 22 away from the female coupler 24. This separation force is resisted by the connection between the finger lugs 56 on the male coupler 22, and the aligned, fixed lugs 76 on the female coupler 24. The finger lugs 56 are longitudinally locked on the female coupler 24 by the interlock 82, the ramped abutment surfaces 58, 78 and by the sleeve 64 which prevents the fingers 52 from flexing outwardly to release the lugs 56 from the fixed lugs 76.

Figure 5:
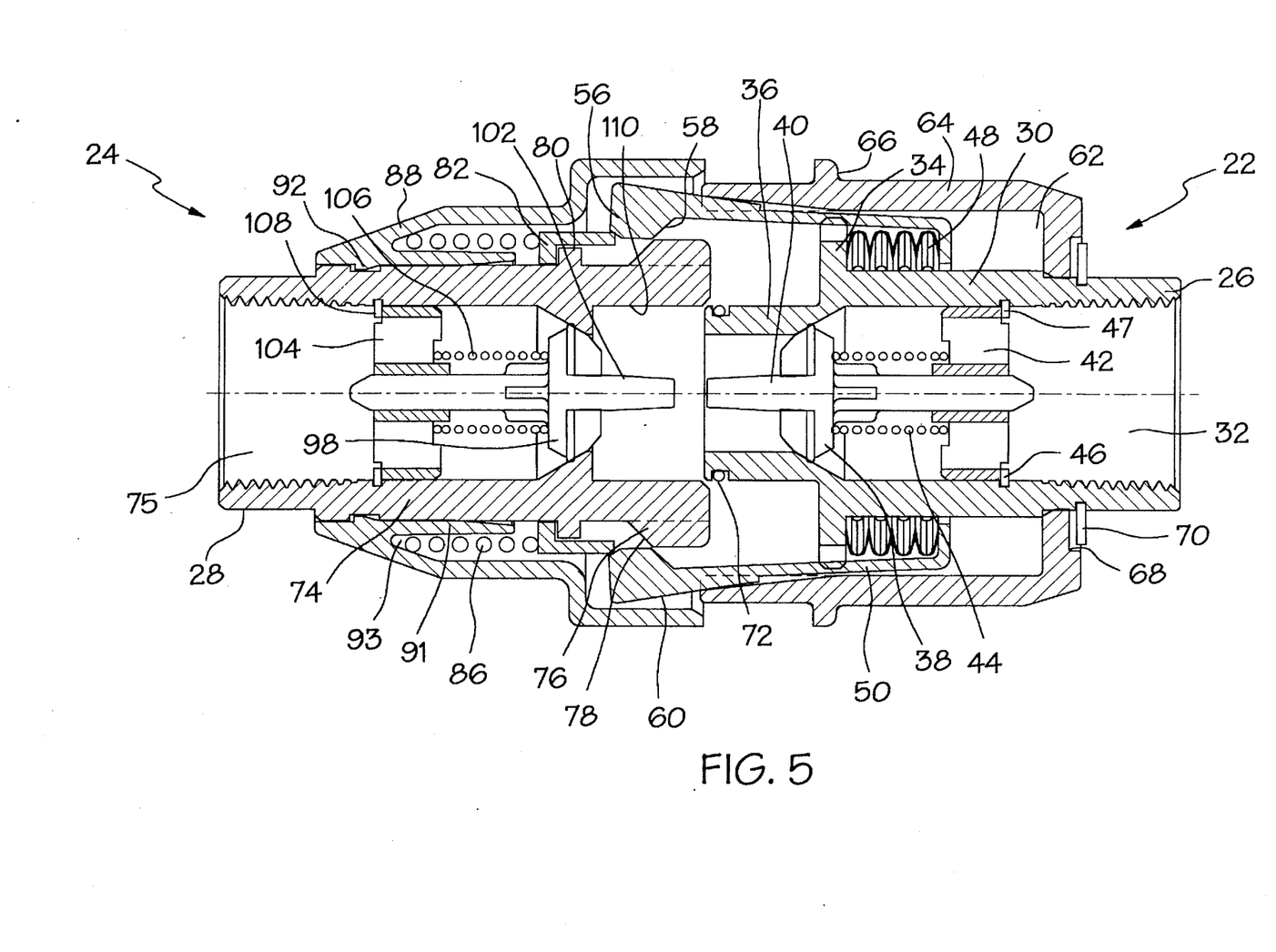
FIG. 5 is a longitudinal sectional view of the breakaway unit of FIG. 4, but showing the couplers in a position just prior to decoupling.

As shown in FIG. 5, when opposing axial tension forces are applied to couplers 22, 24, the wave spring 48 compresses from the pull of the force fingers 52, which is transmitted through the coupling 50, and the opposing pull of body 30 which is transmitted to the spring through flange 34. Since the force fingers 52 are longitudinally locked against the lugs 76 on the female coupler 24 along ramped surfaces 58, the force fingers are constrained to move with the female coupler 24, while the opposing forces on the male coupler 22 pull the male body 30 and sleeve 64 in an opposite direction.

As the opposing forces begin to separate the male coupler 22 from the female coupler 24, the sleeve 64, which is mounted on body 30, axially displaces along with the body along the locked force fingers 52, in a direction away from the finger lugs 56. As the opposing forces on the unit 16 increase, the wave spring continues to compress enabling the sleeve 64 to be displaced further along the force fingers 52. At the separation force, the sleeve 64 is displaced along the fingers 52 a sufficient distance that the finger lugs 56 are free of the sleeve 64 and flex outwardly away from the fixed lugs 76. Once the finger lugs 56 are flexed outwardly of the lugs 76, the male coupler 22 is readily pulled free of the female coupler 24. As this occurs, the poppet valve stems separate, and the valves seal the fuel passages 32, 75 prior to the extension 36, and its sealing O-ring 72, being pulled free from the bore 110, so that there is but a minimal spillage of fuel.

After a drive away, one of the couplers 22, 24 and the corresponding hose section remains attached to the dispenser 10, without causing any damage to either the dispenser or the coupler. Likewise, the other of the couplers 22, 24 remains attached to the other section of the hose. Although this second coupler is likely dragged behind the vehicle as it drives off, the coupler will normally be capable of reuse, since the brunt of any damage from the coupler being dragged behind the vehicle will be borne by the protective sleeve and not by the internal working components of the coupler. Thus, the nozzle, hose and coupler, after recovery, can be quickly put back in service, simply by inserting the male coupler into the female coupler and rotating it to a locking position again.

Figure 6:
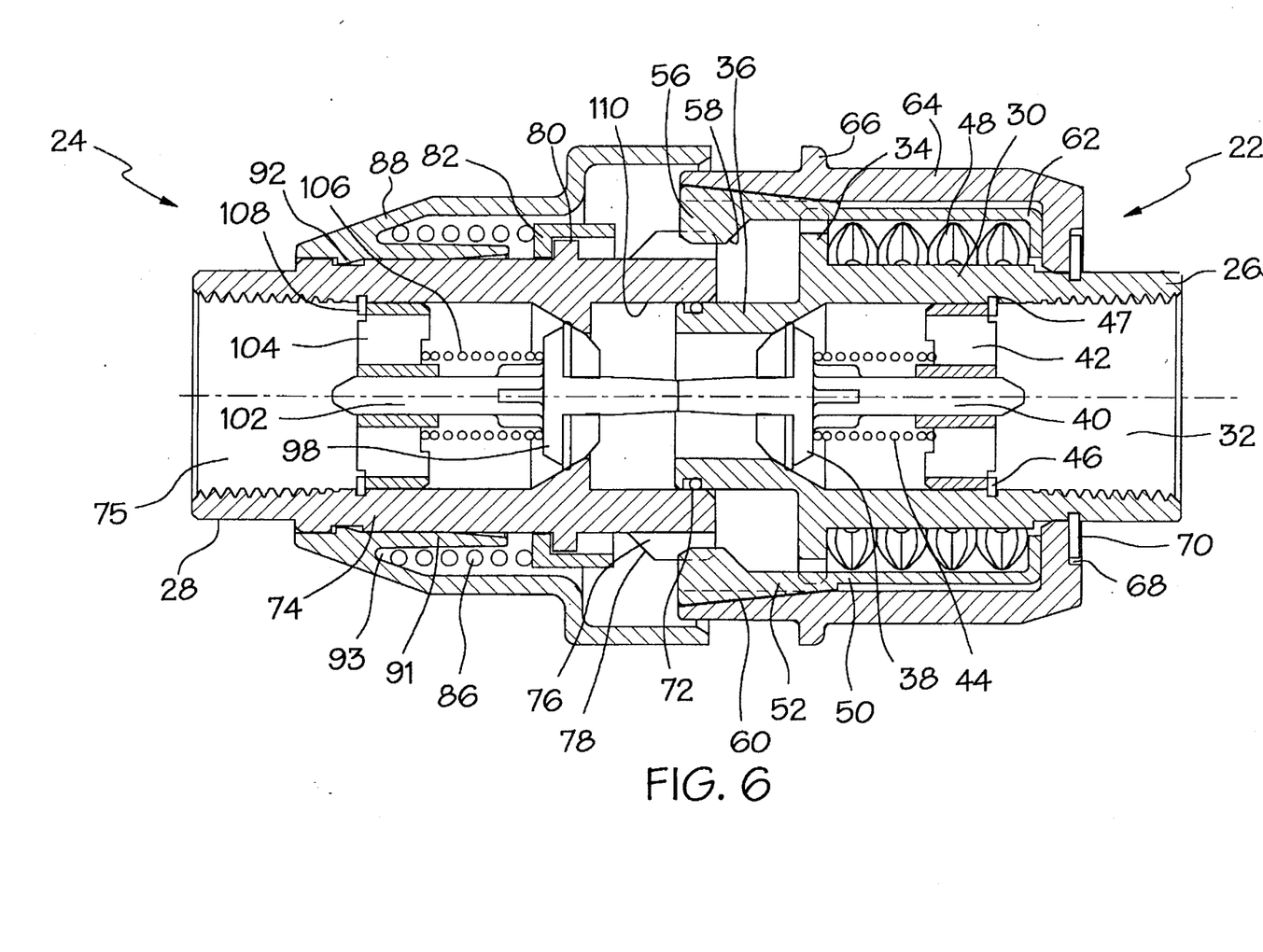
FIG. 6 is a longitudinal sectional view of the breakaway unit of FIG. 4 showing the couplers in a dry reconnect position.

Since the O-ring 72 is placed adjacent to the forward end of the extension 36, the O-ring engages the sides of bore 110 in a sealing manner as the male coupler 22 is reinstated into the female coupler 24 as shown in FIG. 6. This contact between the O-ring 72 and the bore 110 prevents any fuel that may escape from the valves 38, 98 as they are reassembled from spilling out of the unit and onto the surrounding ground. Thus, the O-ring 72 provides for a "dry" reconnect after a drive away incidence, further increasing the safety of the unit.

The present invention allows for accurate control over the separation force, through the selection of the wave spring 48. The spring 48 determines the force at which the sleeve 64 is sufficiently displaced from the finger lugs 56 to permit the lugs to flex free of the fixed lugs 76. In the preferred embodiment, the wave spring 48 is selected to provide separation of the couplers at a maximum breakaway force of 250 pounds.

For forces on the unit 16 which are below the separation force, such as line shock forces which occur during normal fueling operations, the wave spring 48 compresses between the flange 34 and coupling 50 to absorb the forces. This compression displaces the sleeve 64 along the force fingers 52. Since line shock forces are short in duration, the displacement will not occur for a long enough period of time to permit the lugs 56 to flex away from the lugs 76. Only at a sustained force, such as with a drive away, will the displacement be great enough to permit separation. Thus, the present invention provides an apparatus which both absorbs line shock forces and provides for accurate setting of the unit separation force.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An improved fuel hose breakaway unit adapted for use in a fuel hose between a fuel dispenser and nozzle to reduce or eliminate damage to the hose and dispenser when a vehicle is driven away from the dispenser with the fuel nozzle still lodged in the vehicle's fuel tank inlet, said breakaway unit comprising:

a first coupler having a body with a fuel passage extending therethrough;

a second coupler having a body with a fuel passage extending therethrough;

a locking mechanism for releasably locking said first and second couplers in an assembled relation, said locking mechanism being responsive to an axially applied separation force for permitting separation of said couplers when the axially applied separation force exceeds a predetermined limit, said locking mechanism including, a plurality of fixed abutment lugs extending from said first body, and a plurality of force fingers angularly spaced about said second body, said force fingers and fixed abutment lugs engaging in axial alignment along a single tapered surface such that said force fingers may slide relative to said fixed abutment lugs while in said assembled relation to absorb axially applied forces below said separation force;

means adjacent to said force fingers for preventing separation of said force fingers from said fixed abutment lugs in said assembled relation; and means for axially displacing said preventing means relative to said force fingers in response to axially applied tension forces to permit separation of said force fingers from said fixed abutment lugs, said displacing means enabling said force fingers to move relative to said second body while in said assembled relation to absorb forces below said separation force, said displacing means determining the separation force at which said preventing means will be displaced to permit separation of said couplers.

2. The unit of claim 1 wherein said displacing means includes resilient means disposed between said force fingers and said second body to absorb forces on said assembled couplers below said separation force.

3. The unit of claim 2 wherein said preventing means includes a rigid sleeve about said force fingers.

4. The unit of claim 3 wherein said force fingers lie in contacting relation with said sleeve in said assembled relation.

5. The unit of claim 4 wherein said sleeve is attached to said second body at one end to move with said second body.

6. The unit of claim 5 wherein said resilient means permits relative movement between said force fingers and said sleeve.

7. The unit of claim 6 wherein said force fingers include moveable lugs disposed at one end, said moveable lugs engaging said fixed abutment lugs along an abutment surface in said assembled relation.

8. The unit of claim 7 wherein said abutment surface is angled to resist separation of said fixed abutment lugs and said moveable lugs in said assembled relation.

9. The unit of claim 8 wherein an interior portion of said sleeve is tapered, said moveable lugs include a tapered surface, and said moveable lugs and said sleeve slidably engage along said tapered surfaces.

10. The unit of claim 9 wherein the inner diameter of said sleeve decreases in a direction away from the mating end of said second coupler.

11. The unit of claim 10 wherein said resilient means is a wave spring.

12. The unit of claim 8 wherein said abutment surface angle is approximately 45 degrees.

13. An improved fuel hose breakaway unit adapted for use in a fuel hose between a fuel dispenser and nozzle to reduce or eliminate damage to the hose and dispenser when a vehicle is driven away from the dispenser with the fuel nozzle still lodged in the vehicle's fuel tank inlet, said breakaway unit comprising:

a first coupler having a body with a fuel passage extending therethrough;

a second coupler having a body with a fuel passage extending therethrough;

a locking mechanism for releasably locking said first and second couplers in an assembled relation, said locking mechanism being responsive to an axially applied separation force for permitting separation of said couplers when the axially applied separation force exceeds a predetermined limit, said locking mechanism including, a plurality of fixed abutment lugs extending from said first body, and a plurality of force fingers angularly spaced about said second body, said force fingers including moveable lugs disposed at one end and engaging said fixed abutment lugs along an angled abutment surface in said assembled relation said moveable lugs including a tapered outer surface;

a rigid sleeve attached to said second body and lying in contacting relation with said force fingers for preventing separation of said force fingers from said fixed abutment lugs in said assembled relation, said sleeve being tapered in a direction away from a mating end of said coupler and engaging the tapered outer surface of said moveable lugs;

a wave spring disposed between said force fingers and said second body for axially displacing said sleeve relative to said force fingers in response to axially applied tension forces to permit separation of said force fingers from said fixed abutment lugs and for absorbing forces on said assembled couplers below said separation force, said wave spring determining the separation force at which said sleeve will be displaced to permit separation of said couplers; and an exterior sleeve on said first coupler which engages said rigid sleeve in a telescoping manner in said assembled relation.

14. The unit of claim 13 wherein said wave spring provides for a separation force of approximately 250 pounds.

15. A fuel hose breakaway unit adapted for use in a fuel hose between a fuel dispenser and nozzle to reduce or eliminate damage to the hose and/or dispenser when a vehicle is driven away from the dispenser with the fuel nozzle still lodged in the vehicle's fuel tank inlet, said breakaway unit comprising:

a first coupler;

a second coupler;

means for releasably locking said couplers in an assembled relation, said locking means being responsive to an axial force above a predetermined separation force to permit separation of said couplers, said locking means including fixed abutment lugs on one of said couplers, and a plurality of flexible force fingers angularly spaced about the other of said couplers, each of said force fingers engaging one of said fixed lugs, in the assembled relation of the couplers, along a single abutment surface such that said force fingers may slide relative to said fixed abutment lugs while in said assembled relation to enable said couplers to absorb axially applied forces below said separation force;

rigid sleeve means surrounding said force fingers to control movement of said force fingers relative to said fixed lugs; and means for axially displacing said sleeve means along said force fingers in response to an axially applied tension force, said displacing means enabling said force fingers to slide relative to said other coupler while in said assembled relation to absorb line shock forces below said separation force, said displacing means displacing said sleeve means away from said abutment surfaces at said separation force to permit separation of said couplers.

16. The unit of claim 15 wherein said displacing means absorbs line shock forces.

17. The unit of claim 16 wherein said abutment surfaces have an angular relation to resist separation below said predetermined separation force.

18. The unit of claim 17 wherein said force fingers include tapered surfaces which engage a tapered surface on an inner portion of said sleeve in said assembled relation to resist outward movement by said fingers.

19. The unit of claim 18 wherein said surface taper is approximately 6 degrees.

20. The unit of claim 19 wherein said force fingers are mounted on said other coupler through said resilient means, said resilient means permitting said force fingers to move relative to said other coupler in response to an axially applied tension force.

21. The unit of claim 20 wherein said rigid sleeve is attached to said other coupler and surrounds said force fingers and resilient means, said sleeve being moveable with said other coupler to permit relative movement between said sleeve and force fingers in response to an axially applied tension force.

22. A fuel hose breakaway unit adapted to be connected in series flow relation with a hose and a fuel dispensing nozzle to minimize, if not fully prevent, damage in the event a vehicle is driven away with the nozzle lodged in the vehicle's fuel tank or there is otherwise a connection between the hose and the drive away vehicle, said breakaway unit comprising:

a first coupler, a second coupler, and means for releasably locking said couplers in assembled relation, said locking means being responsive to an axial tension force to permit separation of the couplers, said couplers each having a fuel passage and valve means which automatically shift from an open position to a closed position when the couplers are separated, wherein the couplers when separated, are alignable in a relative angular relation in which the locking means are offset to a position permitting the couplers to be longitudinally shifted into a telescoped relation, the couplers, when so telescoped, are relatively rotatable to a position in which the locking means releasably lock the couplers in their assembled relation, and the locking means includes a plurality of fixed abutment lugs projecting in angular relation about the circumference of one of said couplers to define openings therebetween, a plurality of force fingers disposed about the other of said couplers, each of said force fingers including a moveable lug at one end, said moveable lug having a width that is less than a separation between said fixed abutment lugs and, respectively alignable with the openings therebetween, whereby said couplers may be longitudinally displaced to a position wherein said moveable lug may be rotated into locking engagement with said fixed abutment lugs, and a sleeve extending about said force fingers and moveable lugs and abutting against the radially outer surfaces thereof, said sleeve substantially preventing radially outward movement by said moveable lugs; and means for axially displacing said sleeve relative to said force fingers in response to an axially applied separation force, to enable said moveable lugs to flex outwardly of said sleeve to separate said couplers, said displacing means enabling said force fingers to move relative to said other coupler while in said assembled relation to absorb axially applied forces below said separation force.

23. A fuel hose breakaway unit adapted for use in a fuel hose between a fuel dispenser and nozzle to reduce or eliminate damage to the hose and dispenser when a vehicle is driven away from the dispenser with the fuel nozzle still lodged in the vehicle's fuel tank inlet, said breakaway unit comprising:

a first coupler;

a second coupler;

means for releasably locking said couplers in assembled relation, said locking means being responsive to a predetermined axial tension force to permit separation of said couplers;

said first coupler including a first body with a fuel passage extending therethrough;

said second coupler including a second body with a fuel passage extending therethrough, said fuel passages being arranged to engage in series flow relation in said assembled relation;

valve means disposed in each of said fuel passages, said valve means automatically shifting from an open position to a closed position when said couplers are separated;

said locking means including a plurality of fixed lugs projecting about a circumference of said first body, said fixed lugs including angled contact surfaces, and a plurality of force fingers angularly spaced about said second body, each of said force fingers including a moveable lug at one end having an angled contact surface, said fixed and moveable lugs engaging along said angled contact surfaces in said assembled relation;

a spring disposed between said force fingers and said second body such that said spring compresses between said force fingers and body in response to axial tension forces on said couplers, said force fingers moving relative to said second body in response to said spring compression to absorb axially applied forces on said unit; and a rigid sleeve surrounding said force fingers and moveable lugs to substantially prevent movement of said lugs and separation of said fixed lugs and moveable lugs in said assembled relation, said sleeve being mounted on said second body for movement therewith, said sleeve including a tapered interior portion in sliding engagement with a tapered outer surface on said moveable lugs, said sleeve being slidable axially along said tapered surfaces when said spring is compressed between said second body and force fingers, said spring compressing to pull said sleeve away from said moveable lugs to release said moveable lugs from said fixed abutment lugs and separate said couplers, when said spring compression equals said separation force.

24. An improved fuel hose breakaway unit for use in a fuel hose between a fuel dispenser and a nozzle, comprising:

a first coupler, the first coupler having a body with a first end adapted to interface with a dispensing hose, a second end adapted to interface with a releasable coupling mechanism, and an internal flow passage extending between the first and second ends, the second end of the first coupler having a first abutment surface that extends radially outwardly from the first coupler;

a second coupler, the second coupler having a body with a first end adapted to fit circumferentially about and receive the second end of the first coupler, a second end adapted to interface with a dispensing hose, and a fuel passage extending between the first and second ends, the first end of the second coupler having a second abutment surface that extends radially inwardly from the second coupler and selectively engages the first abutment surface on the second end of the first coupler, the first and second abutment surfaces being operative to prevent axial separation of the first and second couplers when engaged with the first end of the second coupler being radially expandable to disengage the first and second abutment surfaces; and an axially displaceable radial restraining structure circumferentially disposed about the first end of the second coupler for selectively preventing radial expansion of the second abutment surface, the radial restraining structure being moveable from a first axial position that prevents radial expansion of the first end of the second coupler to a second axial position that allows the first end of the second coupler to expand radially, the radial restraining structure being resiliently urged to the first position and being movable to the second position by a predetermined axial force, said unit further including resilient means for enabling said first coupler to move relative to said second coupler while said couplers are engaged along said abutment surfaces to absorb forces below said predetermined axial force.

* * * * *